United States Patent [19]

Braun et al.

[11] Patent Number: 5,179,772
[45] Date of Patent: Jan. 19, 1993

[54] APPARATUS FOR REMOVING BURRS FROM METALLIC WORKPIECES

[75] Inventors: E. Braun; Jürgen Wojciechowski, both of Dillingen, Fed. Rep. of Germany

[73] Assignee: PLAKOMA Planungen und Konstruktionen von maschinellen Einrichtungen GmbH, Dillingen, Fed. Rep. of Germany

[21] Appl. No.: 692,281

[22] Filed: Apr. 26, 1991

[30] Foreign Application Priority Data

Oct. 30, 1990 [DE] Fed. Rep. of Germany ....... 4034466

[51] Int. Cl.$^5$ .............................................. B23D 1/22
[52] U.S. Cl. .................................. 29/81.05; 29/33 A; 409/140
[58] Field of Search ................. 29/33 A, 81.05, 81.11, 29/81.13, 81.15; 409/139, 140, 234, 300; 51/168; 407/31

[56] References Cited

U.S. PATENT DOCUMENTS

| | | | |
|---|---|---|---|
| 567,756 | 9/1896 | Strite | 29/81.05 X |
| 860,760 | 7/1907 | Müller | 29/81.05 |
| 1,097,976 | 5/1914 | Henderson | 409/139 X |
| 1,194,617 | 8/1916 | Goss | 29/81.11 |
| 2,688,792 | 9/1954 | Sunnen | 407/31 |
| 3,791,258 | 2/1974 | Krall et al. | 409/139 |
| 4,672,726 | 6/1987 | Delbecq et al. | 29/33 A |

FOREIGN PATENT DOCUMENTS

| | | | |
|---|---|---|---|
| 0083032 | 6/1957 | Denmark | 29/81.05 |
| 1503395 | 10/1967 | France | 29/81.05 |

Primary Examiner—Z. R. Bilinsky
Attorney, Agent, or Firm—Peter K. Kontler

[57] ABSTRACT

Apparatus for removing burrs which develop on semi-finished metallic products in the course of a flame cutting operation has a shaft which is driven to rotate about a horizontal axis and carries an array of round, polygonal and/or oblong cutting tools which extend radially beyond its peripheral surface. The shaft is movable up and down adjacent the path of movement of metallic products with the burrs located at the undersides of the products. When a burr is moved to a position above the shaft, the latter is lifted and is set in rotary motion so that its axially staggered tools remove and simultaneously fragmentize the burr. The shaft is then lowered and the product is advanced to move another burr of the same product to an optimum position for removal of the burr or to provide room for transport of another product to the deburring station. The tools can be used for removal of burrs from straight or curved metallic products.

15 Claims, 3 Drawing Sheets

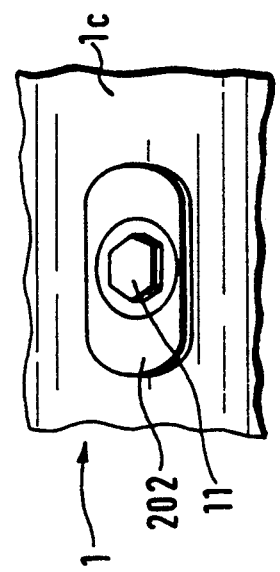
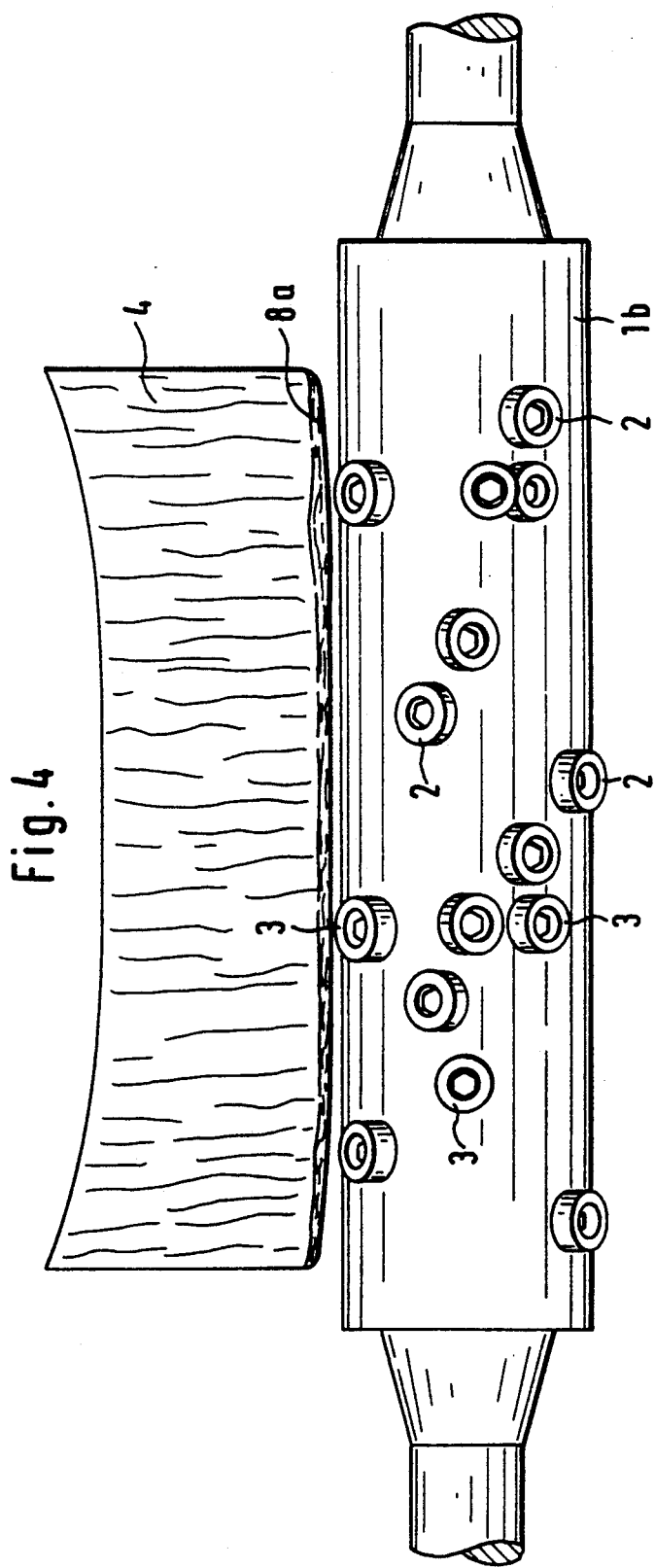
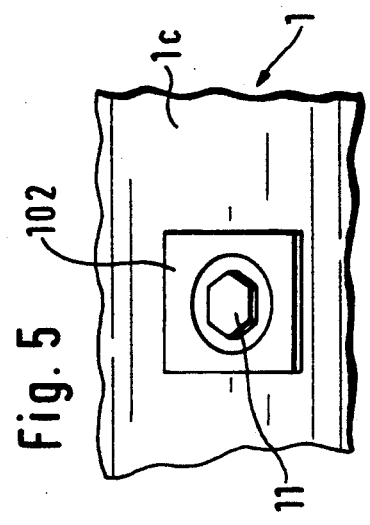

APPARATUS FOR REMOVING BURRS FROM METALLIC WORKPIECES

BACKGROUND OF THE INVENTION

The invention relates to improvements in apparatus for removing projections from metallic workpieces, and more particularly to improvements in apparatus for removing burrs, fins or other irregularities from semifinished metallic products such as slabs, billets, blooms, ingots and the like. Still more particularly, the invention relates to improvements in apparatus for removing burrs which develop as a result of flame cutting ingots, slabs and/or other semifinished metallic products.

Burrs develop when a metallic slab, billet or a like semifinished product is subjected to a flame cutting operation. Such burrs consist of or contain slag and/or molten or at least partially broken off metallic ribs, webs or other configurations, normally at the underside of the product. Such burrs cause, or are likely to cause, problems during subsequent advancement through an oven or another suitable temperature raising unit and/or during movement through a rolling machine or one or more other treating stations. The presence of burrs in the products which are rolled affects the appearance and/or the quality of the finished product or products. Therefore, it is necessary and desirable to completely remove or to smoothen the burrs, preferably immediately downstream of the flame cutting station.

Published German patent application No. 37 00 207 discloses a burr removing apparatus wherein a rotary roller-shaped carrier is placed adjacent the path of movement of semifinished metallic products in a rolling machine or mill and is provided with several pivotable or rockable hammers which are installed next to each other and are designed to perform pendulum type movements. The path of movement of the hammers is tangential to the path of movement of that edge of a semifinished product which carries a burr. The path of hammers extends transversely of the burr or burrs which are to be removed. A drawback of the apparatus which is described and shown in the published German patent application is that it is expensive and overly sensitive and prone to malfunction because it comprises a large number of mobile parts. Moreover, pivotal mounting of several hammers on a rotating carrier is likely to be dangerous if a hammer happens to become detached or a portion of the hammer becomes detached and is propelled by centrifugal force to cause injury to one or more persons nearby and/or to cause much material damage. Still further, the apparatus of the German reference exhibits the drawback that it tends to remove elongated burrs which can present serious problems in connection with their comminution and disposal.

OBJECTS OF THE INVENTION

An object of the invention is to provide a novel and improved apparatus which is constructed and assembled and operated in such a way that the removed burrs can be more readily disposed of than those which are removed by resorting to heretofore known apparatus.

Another object of the invention is to provide a simple, compact and inexpensive but highly versatile apparatus which can reduce the size of burrs in the course of the removing operation.

A further object of the invention is to provide an apparatus which can be used as a superior substitute for heretofore known apparatus adjacent the path of semifinished metallic products in rolling mills, steel mills and other metal forming, shaping and processing plants.

An additional object of the invention is to provide an apparatus which, in addition to removing burrs from semifinished metallic products, can also serve to perform other important and desirable functions such as comminuting the removed burrs and/or assisting in the transport of or transporting metallic products in the form of billets, slabs, ingots, blooms and the like.

Still another object of the invention is to provide a novel and improved method of removing and simultaneously comminuting burrs which develop on metallic products in the course of a flame cutting operation.

SUMMARY OF THE INVENTION

The improved apparatus is designed to remove burrs or fins from semifinished metallic products such as billets, ingots, slabs, blooms and the like, particularly those burrs which develop as a result of flame cutting. The improved apparatus comprises an elongated rotary carrier (hereinafter called shaft) having a peripheral surface, means for rotating the shaft, and a plurality of burr removing cutting tools provided at and extending from the peripheral surface of the shaft. The shaft can be mounted for rotation about a substantially horizontal axis, and the apparatus can further comprise means for moving the shaft up and down substantially transversely of the axis of rotation into and from engagement with a product which is positioned above the shaft.

The arrangement can be such that at least one of the cutting tools is substantially round, polygonal or oblong. Furthermore, at least one of the cutting tools can extend substantially radially of the shaft and can have a substantially square outline.

The apparatus can further comprise product transporting or advancing elements (e.g., in the form of knobs or analogous protuberances) at the peripheral surface of the shaft.

The rotating means can comprise a drive which is designed to rotate the shaft at a plurality of different speeds in a clockwise and/or in a counterclockwise direction.

At least some of the tools are preferably staggered in the axial direction of the shaft, and at least some of the tools can be staggered in the circumferential direction of the shaft. Furthermore, at least one of the tools can be biased by at least one spring. For example, the at least one tool can be mounted in the shaft for movement substantially radially of the axis of the shaft to be biased radially outwardly (away from the axis of the shaft) by one or more helical and/or other suitable springs. This enables the thus mounted tool to yield when it engages a particularly large burr or another unevenness at the exterior of a metallic product which is to be relieved of burrs.

The apparatus can further comprise means for moving the shaft axially, particularly means for pulsating, vibrating, oscillating or similarly moving the shaft back and forth in the axial direction.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

FIG. 4 is an enlarged elevational view of the shaft of the improved apparatus, with the cutting tools in the process of removing one or more burrs from a bent metallic product;

FIG. 5 is a plan view of a polygonal cutting tools; and

FIG. 6 is a plan view of an oblong (particularly substantially elliptical) cutting tool.

DESCRIPTION OF PREFERRED EMBODIMENTS

Figure 1:
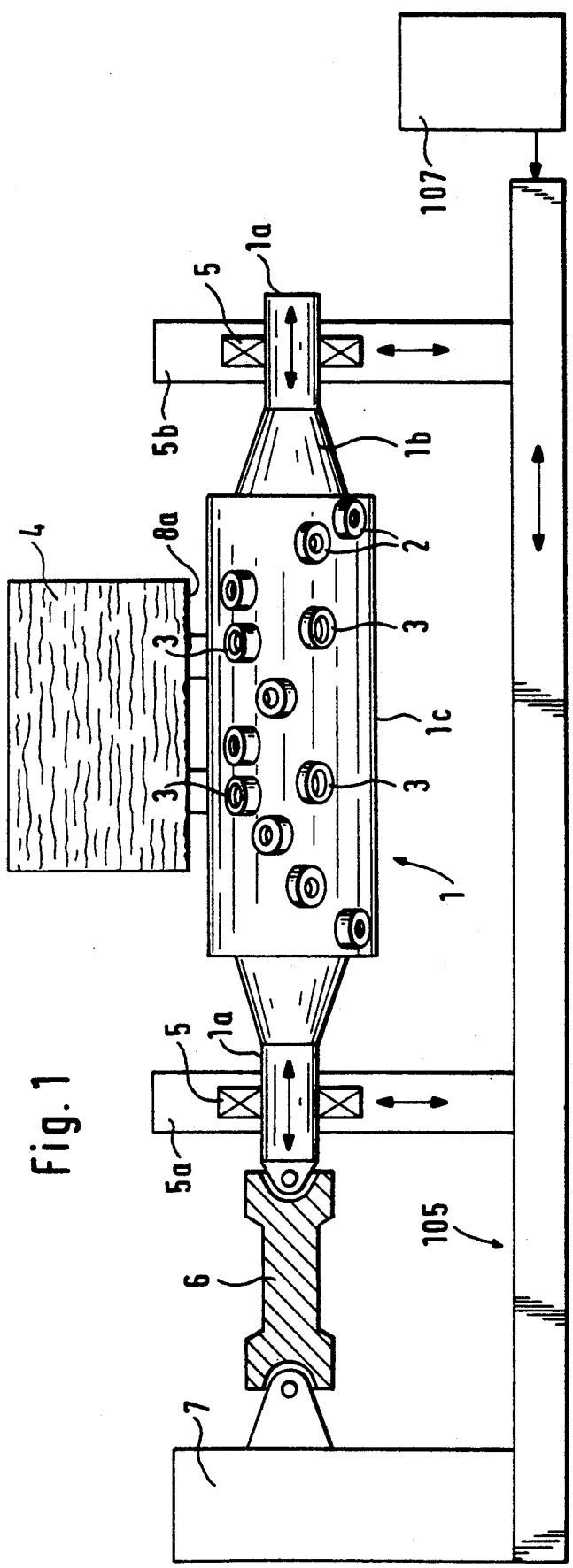
FIG. 1 is a schematic partly elevational and partly vertical sectional view of a burr removing apparatus which embodies one form of the invention and is installed beneath the path of movement of semifinished metallic products in a rolling mill or in another plant wherein metallic workpieces are subdivided by flame cutting with the attendant development of burrs.

The apparatus which is shown in FIG. 1 comprises an elongated horizontal shaft 1 having two coaxial stubs 1a and a larger-diameter central portion 1b with a cylindrical peripheral surface 1c. The stubs 1a are mounted in bearings 5 which are provided in vertically movable supports 5a and 5b serving as a means for moving the shaft 1 up and down so that the burr cutting tools 2 at the peripheral surface 1c can be moved into material removing engagement with a burr 8a at the underside of a semifinished metallic product 4 at a level above the improved apparatus. The supports 5a and 5b are movable relative to a frame 105 which further carries a reversible variable-speed drive 7 serving as a means for rotating the shaft 1 at several speeds in clockwise and counterclockwise directions through the medium of a universal joint employing a cardan shaft 6. The exact nature of the rotating means 7 forms no part of the invention; such rotating means can employ a reversible variable-speed electric motor or two variable-speed electric motors one of which serves to rotate the shaft 1 in a clockwise direction and the other of which is put to use when the shaft 1 is to be rotated in a counterclockwise direction. The entire frame 105 with the supports 5a, 5b and rotating means 7 can be pulsated, oscillated or otherwise reciprocated in the axial direction of the shaft 1 by a unit 107 which can employ an eccentric or the like, not specifically shown.

The distribution of round cylindrical cutting tools 2 at the peripheral surface 1c of the shaft 1 is such that the axes of pairs of tools 2 are located in planes which include the axis of rotation of the shaft 1. FIG. 3 shows that the tools 2 are staggered in the axial direction as well as in the peripheral or circumferential direction of the shaft 1. This ensures that, when an elongated burr 8a or 8b (FIG. 2) is to be removed from a semifinished metallic product 4 (e.g., a steel block or slab), and such burr is parallel or nearly parallel to the axis of rotation of the shaft 1, it is acted upon and comminuted or fragmentized by a substantial number of discrete tools 2 in response to rotation of the shaft by the rotating means 7 while the product 4 is held at a standstill at a level above the shaft 1.

FIGS. 1 and 3 show that the shaft 1 further carries a number of spaced-apart product transporting or entraining elements 3 in the form of knobs which project from the peripheral surface 1c of the shaft portion 1b and can serve as a means for transporting the product 4 along a path which extends at right angles to the axis of the shaft. The entraining or transporting elements 3 become effective upon completed removal of one or more burrs 8a, 8b.

Figure 2:
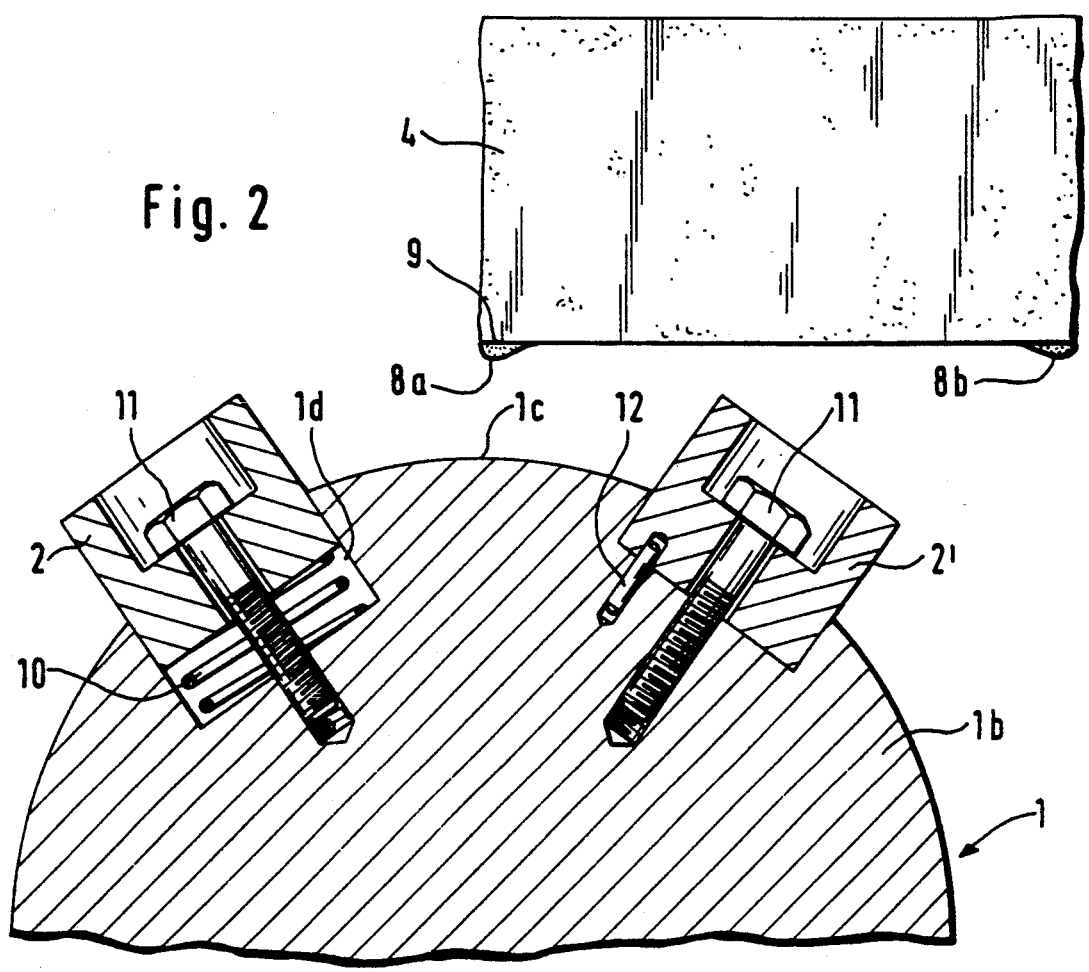
FIG. 2 is an enlarged fragmentary transverse vertical sectional view of the shaft and a central sectional view of two different cutting tools at the peripheral surface of the shaft, a metallic product with two burrs at its underside being shown above the shaft in a position for removal of one of the burrs.
Figure 3:
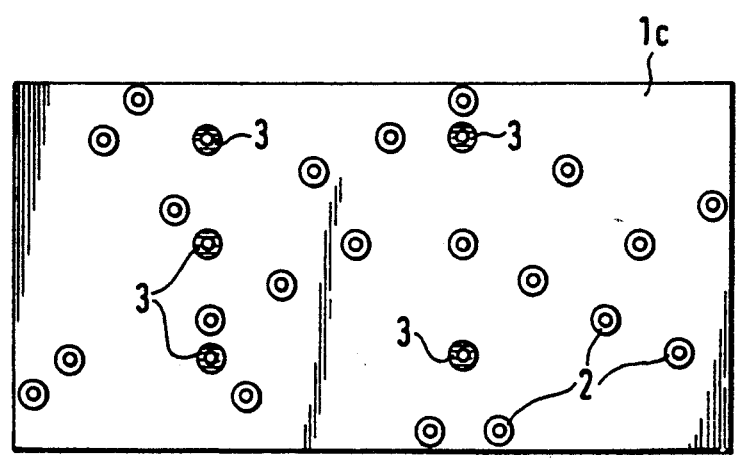
FIG. 3 is a developed view of the outermost layer of the central portion of the shaft and shows the distribution of cutting tools and product transporting elements.

The burrs 8a, 8b at the underside of the product 4 which is shown in FIGS. 1 and 2 are removed in the following way: The supports 5a, 5b are lowered to maintain the shaft 1 in a lower end position and the product 4 (e.g., a steel ingot or slab arriving from a flame cutting station) is caused to advance above the lowered shaft 1 at a level such that the burr 8a is caused to come to a halt when it is located at a level directly above and is substantially parallel with and close to the axis of the shaft 1. The product 4 can be supported by a customary roller table (not shown) if the improved burr removing apparatus is installed in a rolling mill. The product 4 is then maintained in the aforedescribed position in which the burr 8a is adjacent to the apex of the peripheral surface 1c and is substantially parallel with the axis of rotation of the shaft 2. The motor or motors (e.g., fluid-operated hydraulic cylinder and piston units) which move the supports 5a, 5b are then actuated to lift the shaft 1 before the rotating means 7 is set in motion to drive the shaft through the medium of the cardan shaft 6. A single full revolution of the shaft 1 suffices to ensure that each of the axially staggered cutting or separating tools 2 engages and removes an adjacent portion of the burr 8a so that the latter is broken up into a number of short pieces or fragments in the course of a single removing or separating step. The next step involves lowering the shaft 1 by the supports 5a, 5b, and the rolling table for the product 4 is then set in motion to advance the burr 8b to the position previously occupied by the already removed burr 8a. The supports 5a, 5b thereupon lift the shaft 1 and the rotating means 7 is started to ensure that the shaft 1 completes at least one full revolution which results in removal and simultaneous comminution or fragmentizing of the burr 8b into a substantial number of shorter pieces or fragments. It is preferred to change the direction of rotation of the shaft 1 for removal of the burr 8b.

The shaft 1 of FIG. 2 is ready to be rotated in a counterclockwise direction in order to ensure that its tools 2 remove the 8a which is located at the topmost portion of the peripheral surface 1c and is parallel or nearly parallel to the axis of rotation of the shaft 1. The burr 8a adheres to the product 4 at the locus which is pinpointed at 9, and such burr is brittle so that it is readily broken up by the axially staggered tools 2 during rotation of the shaft 1 in a counterclockwise direction. The lower front edge of the thus treated product 4 is smooth or substantially smooth because it has been relieved of the burr 8a. The product 4 is then advanced to the left so as to move the burr 8b to the position previously occupied by the already removed burr 8a, and the shaft 1 is then raised to the level of FIG. 2 before it is set in rotary motion to ensure that its tools 2 remove and break the burr 8b whereby the removed particles or fragments of such burr are propelled in a direction to the right, i.e., beyond the rear end face of the product 4.

Since the tools 2 are subject to wear, they are preferably separably but reliably secured to the central portion 1b of the shaft 1 so that they project beyond the peripheral surface 1c. As can be seen in FIG. 2, the shaft 1 can carry two or more types of different tools or two or more sets of differently mounted tools. The left-hand tool 2 of FIG. 2 is mounted for limited movement in the radial direction of the axis of rotation of the shaft 1 and is biased to an outer end position by a coil spring 10 at the bottom of a radial blind bore 1d in the peripheral surface 1c. The means for limiting the extent of radially outward movement of the left-hand tool 2 of FIG. 2 is the head of a threaded bolt 11 which serves as a means for separably but reliably securing the left-hand tool 2 of FIG. 2 to the central portion 1b of the shaft 1. The right-hand cutting tool 2' of FIG. 2 is not biased by one or more springs and is held against rotation about the axis of the respective bolt 2 by a pin 12 which is recessed into the shaft portion 1b as well as into the tool 2'. The tools 2 and 2' are cylinders having circular outlines.

Instead of or in addition to supporting round cutting tools 2 and/or 2', the central portion 1b of the shaft 1 can carry one or more polygonal (e.g., rectangular or square) tools (one shown in FIG. 5, as at 102) which are partially recessed into complementary sockets of the shaft portion 1b and are held against radial movement by threaded bolts 11.

FIG. 6 shows that the shaft portion 1b can support at least one oblong (e.g., substantially elliptical) cutting tool 202 in a complementary socket of the peripheral surface 1c. All cutting tools can extend substantially radially of the shaft portion 1b and outwardly beyond the peripheral surface 1c of the shaft 1.

An advantage of spring biased tools (such as the left-hand tool 2 of FIG. 2) is that they can yield in response to engagement with the adjacent underside of a product 4 but are biased radially outwardly of the axis of rotation of the shaft 1 to reliably engage a burr 8a or 8b and to break the adjacent portion of the burr away from the major part of the product 4 in response to rotation of the shaft 1.

The distribution of tools on the central portion 1b of the shaft 1 can depart from that which is shown in FIG. 3. For example, the tools can be arrayed in rows of three or more tools and each such row can extend in parallelism with the axis of rotation of the shaft 1. When the shaft 1 is driven to orbit the tools about its axis, each tool breaks from the burr 8a or 8b a piece which need not be longer or much longer than the diameter of a round tool. Since the tools are staggered in the axial direction of the shaft 1, the burr 8a or 8b is broken up into a large number of small pieces and the remaining portions of the burr are broken off as a result of axial reciprocatory movement of the shaft under the action of the drive 107. The transporting elements 3 support the product 4 upon completion of a burr removing operation and can also assist in, or carry out, the transport of the product to move the burr 8b to the position which was previously occupied by the already removed burr 8a, or to advance the completely deburred product 4 beyond the deburring station.

FIG. 4 shows that the improved apparatus can be used with equal or similar advantage for removal of burrs 8a from curved metallic products 4. Longitudinally spaced apart portions of the illustrated burr 8a at the underside of the curved product 4 are removed by pairs of aligned cutting tools 2. This has been found to ensure rapid and highly reliable removal of burrs from such metallic products.

The improved apparatus is susceptible of many additional modifications. For example, the drive 107 can be designed in such a way that the shaft 1 is in continuous motion in a direction to the left or to the right while its cutting tools remove a burr 8a or 8b from the underside of an adjacent semifinished metallic product 4.

An important advantage of the improved apparatus is its simplicity. Thus, save for the provision of one or more spring biased cutting tools (if such tools are used at all), all parts which are carried by the shaft 1 can be fixedly secured to the central portion 1b to thus contribute to simplicity, compactness and lower cost of the apparatus. Moreover, the apparatus can break up elongated burrs into relatively short particles or fragments so that the disposal of removed and simultaneously fragmentized burrs is much simpler and less expensive than the disposal of elongated burrs. The maintenance cost of the improved apparatus is minimal, and the shaft 1 need not carry any moving parts.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for removing burrs from semifinished metallic products following a flame cutting treatment, comprising a rotary shaft having a peripheral surface; means for rotating said shaft; a plurality of burr removing tools provided at and extending from the peripheral surface of said shaft; means for non-movably securing at least one of said cutting tools to said shaft; and product transporting elements at the peripheral surface of said shaft.

2. The apparatus of claim 1, wherein said shaft is rotatable about a substantially horizontal axis and further comprising means for moving said shaft up and down substantially transversely of said axis into and from engagement with a product above said shaft.

3. The apparatus of claim 1, wherein at least one of said tools is substantially round.

4. The apparatus of claim 1, wherein at least one of said tools has a polygonal outline.

5. The apparatus of claim 1, wherein at least one of said tools is oblong.

6. The apparatus of claim 1, wherein at least one of said tools extends substantially radially of said shaft.

7. The apparatus of claim 6, wherein said at least one tool which extends substantially radially of said shaft has a substantially square outline.

8. The apparatus of claim 1, wherein said elements are knobs.

9. The apparatus of claim 1, wherein said rotating means includes means for rotating said shaft at a plurality of different speeds.

10. The apparatus of claim 1, wherein at least some of said tools are staggered in the axial direction of said shaft.

11. The apparatus of claim 10, wherein at least some of said tools are staggered in the circumferential direction of said shaft.

12. The apparatus of claim 1, wherein said tools include a tool which is biased by at least one spring.

13. The apparatus of claim 12, wherein said biased tool is movable substantially radially of said shaft and said at least one spring biases said biased tool radially outwardly of the axis of rotation of said shaft.

14. The apparatus of claim 1, further comprising means for moving said shaft axially.

15. The apparatus of claim 14, wherein said moving means includes means for pulsating said shaft back and forth.

* * * * *